United States Patent
Wang

(10) Patent No.: US 7,305,422 B1
(45) Date of Patent: Dec. 4, 2007

(54) PERFORMING COMPUTATIONALLY INTENSIVE CALCULATIONS WITHIN A DATABASE SERVER THAT PROVIDES A RECOVERY MECHANISM

(75) Inventor: Lie Wang, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 376 days.

(21) Appl. No.: 10/256,915

(22) Filed: Sep. 26, 2002

(51) Int. Cl.
*G06F 12/00* (2006.01)
*G06F 17/30* (2006.01)

(52) U.S. Cl. ...................... 707/203; 707/202

(58) Field of Classification Search ............... 707/202, 707/203, 8, 10, 103 R; 714/15, 16; 709/231
See application file for complete search history.

(56) References Cited

U.S. PATENT DOCUMENTS

| | | | | |
|---|---|---|---|---|
| 5,481,699 | A | * | 1/1996 | Saether ..................... 714/15 |
| 5,764,877 | A | * | 6/1998 | Lomet et al. .................. 714/6 |
| 5,907,848 | A | * | 5/1999 | Zaiken et al. ............... 707/202 |
| 6,125,371 | A | * | 9/2000 | Bohannon et al. .......... 707/203 |
| 6,185,577 | B1 | | 2/2001 | Nainani et al. |
| 6,185,699 | B1 | * | 2/2001 | Haderle et al. .............. 714/19 |

OTHER PUBLICATIONS

Chiu et al. "High Level Specification Of Concurrency Control In Distributed Database Systems", pp. 309-317, 1988, IEEE).*

Paul S. Bradley et al., "Scaling Clustering Algorithms to Large Databases," Proceedings of the 4th International Conference on Knowledge Discovery & Data Mining (KDD98), Jun. 1998, Technical Report, MSR-TR-98-37, Microsoft Research, pp. 1-7.

Goetz Graefe, et al., "On the Efficient Gathering of Sufficient Statistics for Classification from Large SQL Databases," Proceedings of the 4th International Conference on Knowledge Discovery & Data Mining (KDD98), pp. 204-208, Jun. 1998, Technical Report, MSR-TR-98-39, Microsoft Research.

* cited by examiner

*Primary Examiner*—Susan Chen
(74) *Attorney, Agent, or Firm*—Hickman Palermo Truong & Becker LLP

(57) ABSTRACT

A method and apparatus for performing computationally intensive calculations on a database server that provides a recovery mechanism is provided. These calculations involve a series of updates performed on data stored as data items in a database server. An existing recovery mechanism of the database server is used to store previous versions of the data items. The previous versions of the data items are subsequently retrieved from the recovery mechanism and used to determine whether the formula involved in the calculation should be modified, whether to continue the calculations with the current formula, or whether to terminate the calculations. By extending the functionality of the SELECT statement, the program can access the previous versions of the data items.

23 Claims, 5 Drawing Sheets

TABLE T

| | C1 | C2 | C3 | C4 |
|---|---|---|---|---|
| 302 | 5 | 1 | 57 | 0.15 |
| 304 | 6 | 2 | 63 | 2.12 |
| 308 | 7 | 2 | 42 | 3.32 |
| 310 | 8 | 1 | 88 | 1.54 |
| 312 | 12 | 2 | 54 | 2.23 |
| 314 | 4 | 1 | 78 | 1.32 |

FIG. 3

PERFORMING COMPUTATIONALLY INTENSIVE CALCULATIONS WITHIN A DATABASE SERVER THAT PROVIDES A RECOVERY MECHANISM

FIELD OF THE INVENTION

The present invention relates to performing computationally intensive calculations and more specifically to performing computationally intensive calculations within a database server that provides a recovery mechanism.

BACKGROUND OF THE INVENTION

Many programs that perform computationally intensive calculations perform the calculations on data managed by a database system. Thus, a typical calculation operation involves transferring a copy of the data from the database system to the application that performs the calculations (the "computationally intensive application"). Because the amount of data used by a computationally intensive application can be massive, it is often not practical to extract all of the data from the database. Instead, a selective subset of the data may be transferred to the computationally intensive application. However, results generated based on only a subset of the available data tend to be less accurate than results generated based on all of the available data. Thus, it is clearly desirable to address the problems of massive data transfer and less accurate results inherent in existing approaches.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is a block diagram of a table containing data items;

DETAILED DESCRIPTION OF THE INVENTION

Figure 1:
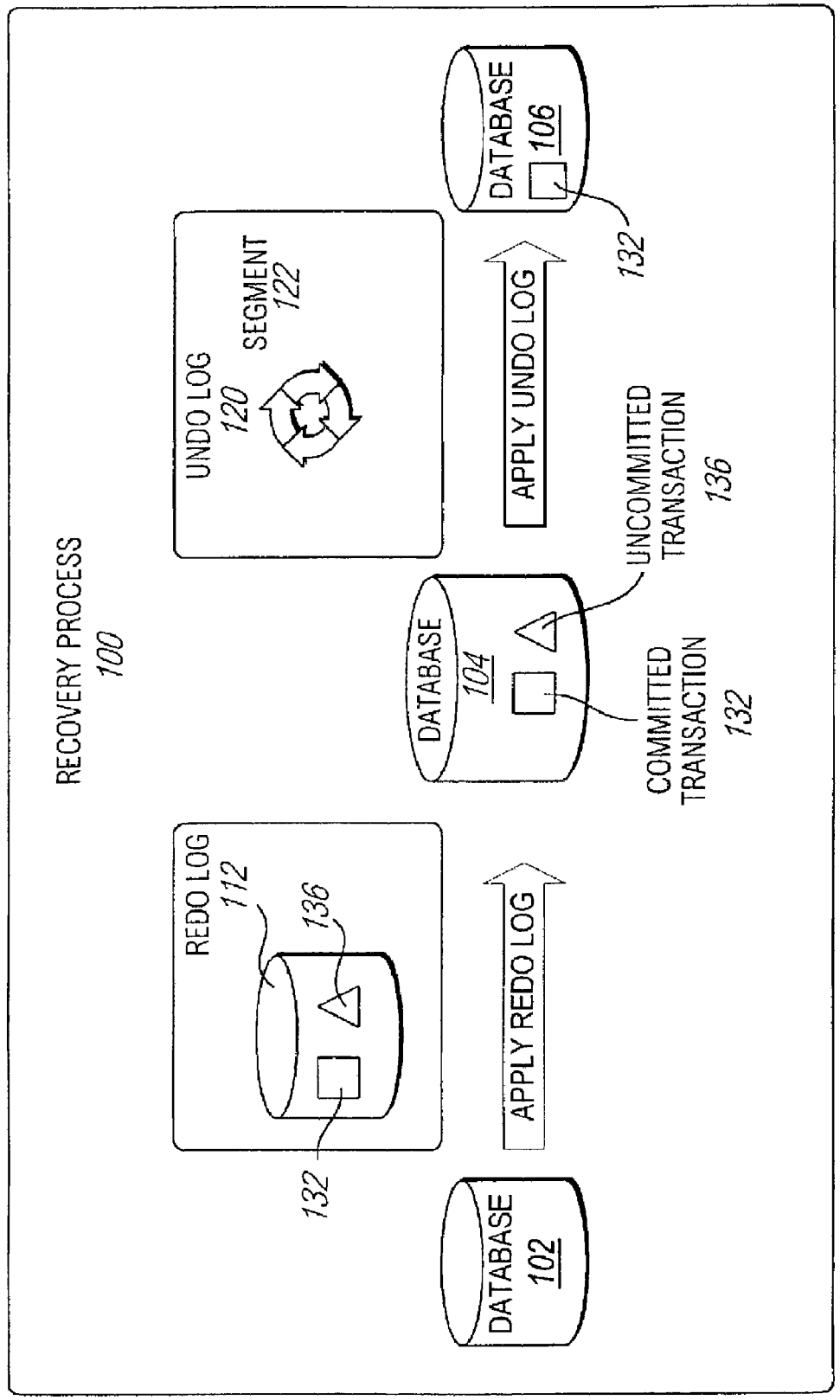
FIG. 1 is a block diagram of a recovery process.

Techniques are described for performing computationally intensive calculations within a database server that provides a recovery mechanism. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

One aspect of performing computationally intensive calculations is the need to access prior states of the values involved in the calculations. For example, the current state of data may be compared to the previous state of data to determine, for example, whether a formula involved in the calculation should be modified, whether to continue the calculations with the current formula, or whether to terminate the calculations. Therefore, previous versions of the data need to be readily available.

According to one embodiment, both the need to access previous states of values, and the need to transfer large amounts of data to computationally intensive applications, are addressed by shifting responsibilities from the computationally intensive applications to the database system that stores the data upon which the calculations are to be performed. Specifically, the database server that stores the data is used to derive the previous versions of the data, and to use database structures, such as indexes, to efficiently access the previous versions of the data.

For example, assume that a program that performs computationally intensive calculations uses a particular piece of data that is stored as a data item in a database. Using the techniques described herein, the calculations may be performed as a transaction within a database server that manages the data item. During the execution of the calculations, the server may perform a series of updates to this data item. Prior to each update of the data item, the database server generates a record that reflects the state of the data item. During subsequent phases of the calculations, the calculations may require previous values of the data item. The database server uses the records thus generated to provide the previous values.

One way of generating such a record is to take advantage of an existing recovery mechanism in the database server. In one embodiment, the database server includes a recovery mechanism that generates undo records, which comprise a list of rollback entries and which are used to remove from the database changes that were made to the database server by uncommitted transactions. Prior to each update of a particular data item, the database server generates a rollback entry, which reflects the state of the particular data item. Each rollback entry is appended to the last rollback entry. In so doing, a list of rollback entries are created which reflects the sequence of updates performed on the particular data item in the database. By providing a mechanism for accessing rollback entries, previous versions of the data item can be retrieved and used in calculations. One way of providing such a mechanism is to extend the functionality of the SELECT statement, as will be described herein.

Because the calculations are performed within the database server that stores the entire set of data upon which the calculations are based, the need to export the data from the database may be avoided. Since there is no need to export the data from the database, the accuracy of the calculations need not be compromised by using only a selected subset of the total available data.

Overview of Change Logging System

The techniques described herein can be used in any database system where previous versions of data items are maintained for any purpose. For example, FIG. 1 depicts a database system that maintains a log of changes for the purpose of recovering a database after a failure. According to an embodiment of the invention, the change logs are also used for the purpose of providing the prior states of data items involved in a computationally intensive calculation, regardless of the purpose for which they were originally maintained.

Referring to FIG. 1, it depicts a recovery process 100 used on a database server that involves two general phases: a "redo" phase and an "undo" phase. For the purpose of explanation, it shall be assumed that database 102 needs to be recovered (e.g., a power failure occurred). Prior to the failure, two transactions 132 and 136 performed changes to data contained in database 102. One of those transactions, transaction 132, committed prior to the failure. Transaction 132 is said to have committed because the change(s) completed and were persistently saved to disk in redo log 112, even though the changes themselves were not applied to the database 102. Transaction 136 was also written to redo log 112, which was persistently saved to disk; it too did not get applied to disk. However, transaction 136 did not commit.

Referring to the state of the DBMS depicted in FIG. 1, immediately after the power failure, changes made by committed transaction 132 are not reflected in database 102. However, changes made by a committed transaction must be durable, which means that they must persist on disk even if a failure occurred.

Redo log 112 fixes part of the problem. The redo log 112 contains a series of redo records that save changes made by statements in each transaction. (The redo log 112 may contain data for multiple transactions.) Redo log 112 is temporarily stored in memory and is saved to disk at a regular interval, called a savepoint, or by explicit or implicitly instruction from a user or process (e.g., a redo log runs out of space in memory and must flush the redo to disk).

Redo log 112 contains redo records for changes made by committed transaction 132 and uncommitted transaction 136. When the database 102 is recovered, the first step in the recovery process is to apply the redo log 112, specifically, to apply the changes recorded in redo log 112 to database 102. After the redo 112 has been applied, the database 102 will look like database 104, which reflects the changes made by transactions 132 and 136.

As may be apparent, applying redo log 112 created a problem, specifically, changes made by uncommitted transaction 136 are reflected in database 104. However, changes made by uncommitted transactions must be removed from the database after a failure occurs. Uncommitted transactions should not be durable. Thus, the data modified by the changes made by transaction 136 is in an inconsistent state. The undo log 120 is designed to fix this problem.

Undo log 120 comprises one or more rollback segments. For example, segment 122 contains data for undoing the changes made by uncommitted transaction 136. After the redo phase, an "undo phase" is performed. During the undo phase, the undo log 120 is used to remove from the database 104 changes that were made to the database 104 by uncommitted transactions. Database 106 is a version of database 104 after applying undo log 120. Notice that changes made by uncommitted transaction 136 are not contained in database 106.

Thus, the changes made by uncommitted transaction 136, which were made when redo log 112 was applied in the redo phase can be "rolled back" using undo log 120 in the undo phase. As uncommitted transaction 136 is rolled back, each change made by transaction 136 is undone, one complete undo record at a time, an opposite order than the order in which the changes were made.

Figure 2:
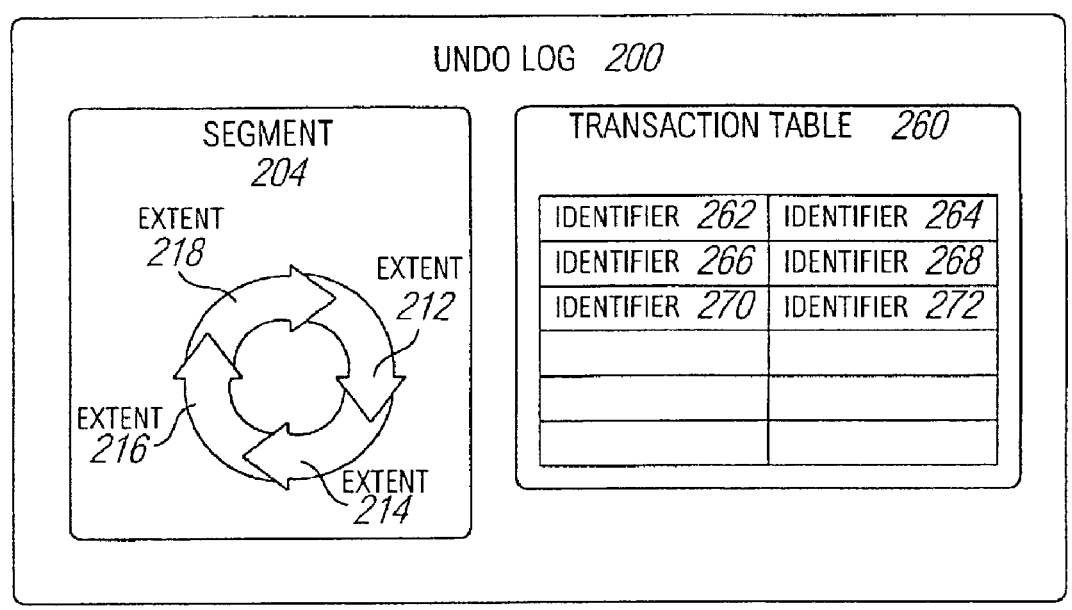
FIG. 2 is a block diagram of an undo log.

FIG. 2 illustrates an alternative structure of an undo log 200. Undo log 200 comprises a rollback segment 204. Segment 204 comprises a plurality of extents 212, 214, 216 and 218. An extent is a logical unit of database storage space. Extents 212, 214, 216 and 218 are used to store a plurality of contiguous undo blocks. Each undo block in an extent may store a plurality of undo records.

In order to keep track of changes made by each transaction, undo log 200 also contains a transaction table 260 to record information about the changes of each transaction stored in the segment 204. The transaction table 260 is useful in identifying the most recently saved undo record(s) for a transaction. For example, in transaction table 260, transaction identifier 262 identifies a particular transaction and pointer 264 points to an undo record in a string of undo records for the particular transaction identified by identifier 262. Likewise, transaction identifier 266 identifies a particular transaction and pointer 268 points to an undo record in a string of undo records associated with transaction identifier 266, as do transaction identifier 270 and pointer 272.

Although not depicted in FIG. 2, segment 204 may keep a header for additional information about changes stored therein, for example information about the transactions, data blocks and undo blocks in the segment 204.

Figure 4A:
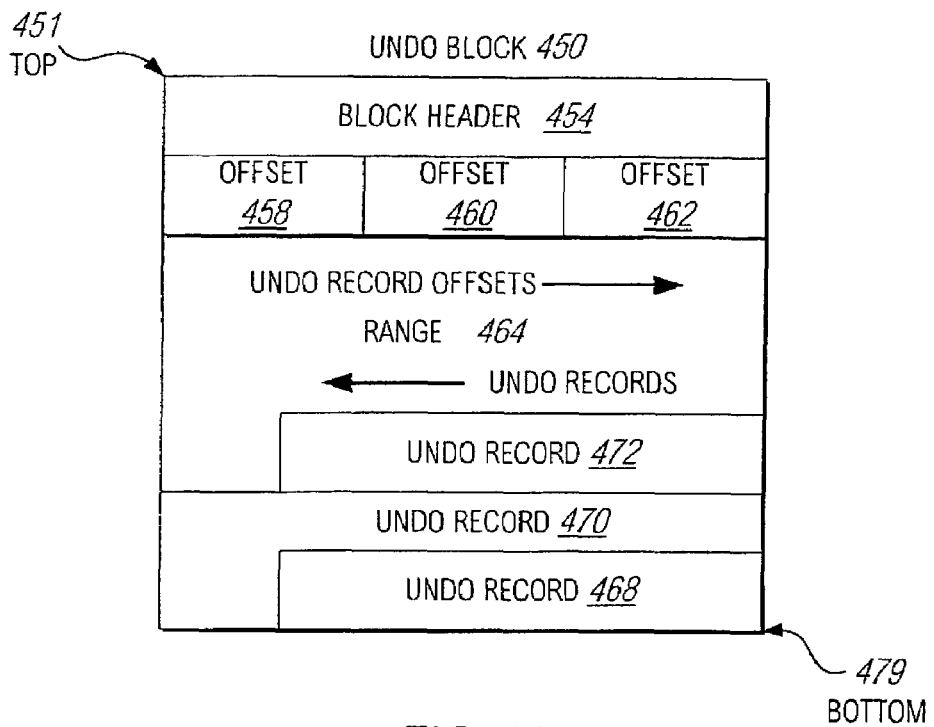
FIG. 4A is a block diagram of an undo block according to one embodiment of the present invention.

According to one embodiment, additional data structures are also associated with the undo log 200. Specifically, an additional data structure used by undo log 200 is undo block 450, which is depicted in FIG. 4A. According to one embodiment, undo block 450 is employed as a data structure in which general information about undo records is stored, as well as the undo records themselves. The undo block 450 is used to help the undo process identify and navigate to a particular undo record 472 (depicted in further detail with reference to FIG. 4B). The undo block 450 is typically stored on persistent disk (e.g., storage device 310). Furthermore, frequently referenced undo records may be placed in a buffer cache for fast access.

Figure 4B:
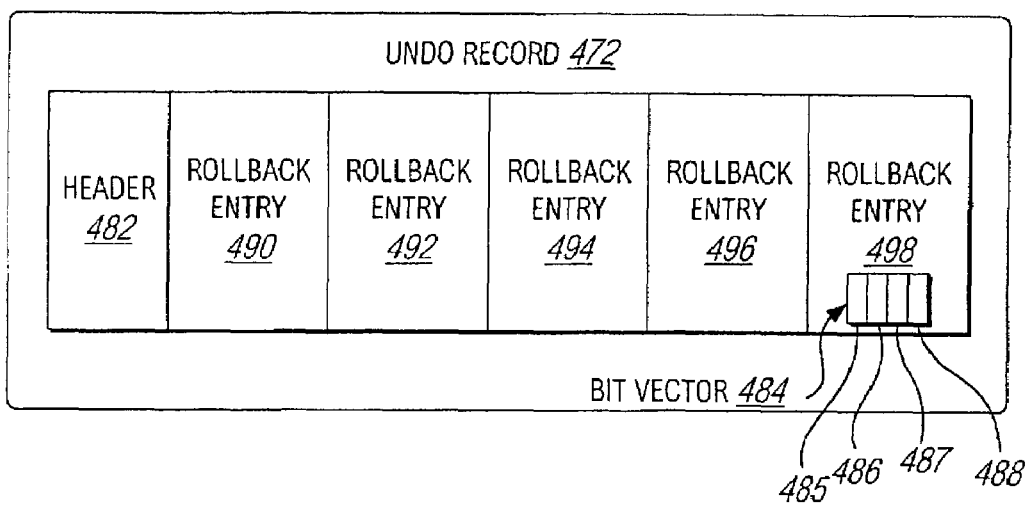
FIG. 4B is a block diagram of an undo record according to one embodiment of the present invention.

Another data structure is undo record 472, depicted in FIG. 4B. The undo record 472 stores general information about the rollback entries therein, as well as the rollback entries themselves. The undo record stores the specific change information for data blocks updated, deleted or modified by changes in a transaction. The undo record 472 depicted in FIG. 4B is a linearized structure and it is typically stored on disk.

Undo block 450, as depicted in FIG. 4A, holds data representing the changes made to one or more data blocks in the database system. According to one embodiment, undo block 450 comprises a block header 454, an array of offsets 458, 460 and 462, and undo records 468, 470 and 472. According to one embodiment, the block header 454 is used to identify the undo records (e.g., 468, 470 and 472) in the undo block 450. Additionally, the block header 454 may be used to store linking information that identifies an order in which the undo records should be performed and/or the transactions the undo records 468, 470 and 472 correspond to. The offsets 458, 460 and 462 are used as tools to facilitate navigation to particular undo records (e.g., 468, 470 and 472) within the undo block 450, specifically, the offsets each give an offset to an address where a particular undo record is located.

Undo block 450 also has a range of storage 464. Range 464 is unused space in the undo block 450 that is designed to be allocated as changes are made and recorded into undo block 450. Undo records 468, 470 and 472 in undo block 450 are stored from the bottom (479) of undo block 450 to the top (451), whereas offsets 458, 460 and 462 are stored from the top (451) of undo block 450 to the bottom (479). The first offset 458 corresponds to rollback entry 468, the second offset 460 corresponds to the second to last rollback entry 470, the third offset 462 corresponds to rollback entry 472 and so on and so forth until range 464 is filled with rollback entries and offsets.

According to one embodiment, and as depicted in FIG. 4B, each undo record (e.g., 472) comprises a header 482 and a plurality of rollback entries (e.g., 490, 492, 494, 496 and 498). As was mentioned above, a rollback entry stores a change made by a transaction and there may be many changes associated with a single transaction. Header 482 comprises data about the undo record, as well as data about the rollback entries in the undo record (e.g., database address, tablespace and rollback entry offsets). Although FIG. 4B depicts only four rollback entries, there may be many more rollback entries in a particular undo record. Further, according to one aspect of the invention, the rollback entries in a particular undo record can correspond to different data blocks.

Also depicted in undo record 472 is a bit vector 484. Bit vector 484 has four bits 485, 486, 487 and 488. Each bit in the bit vector 484 indicates a status of a particular rollback entry. For example, the status bit that corresponds to a particular rollback entry may initially be set to FALSE to indicate that the rollback entry has not been applied. The bit may then be set to TRUE (or "applied") once the rollback entry is applied to its corresponding data block. Although bit vector 484 has only four bits, it may have as many bits as there are rollback entries in the undo record 472. As depicted in FIG. 4B, bits 485, 486, 487 and 488 are status bits for rollback entries 490, 492, 494 and 496 respectively. According to one embodiment, the last rollback entry 498 is modifiable during the undo application process. In this embodiment, information about which rollback entries have been applied, or a "status flag" may be stored in the modifiable last rollback entry 498 (e.g., bit vector 484).

Performing Calculations Using Values from Rollback Entries

FIG. 3 is a block diagram of a table containing data items. Each element in Table T represents a data item. Table T has four columns—c1, c2, c3, c4—and six rows 302, 304, 306, 308, 310, and 312. A SELECT statement, such as "SELECT c1 from T where c2=1" returns the values of the data items in the specified column, c1, from the rows of table T where column c2 equals 1. For example, assuming that table T is populated as depicted in FIG. 3, the statement "SELECT c1 from T where c2=1" would return the value 5 from row 302, skip rows 304 and 308, return the value 8 from row 308, skip row 312, and return the value 4 from row 314.

As already stated, by providing a mechanism for accessing values stored in rollback entries, previous versions of a data item can be retrieved and used to perform computationally intensive calculations. For example, the previous versions of the row 302 could be stored in the undo record 472, the previous versions of the row 310 could be stored in the undo record 470, and the previous versions of the row 314 could be stored in the undo record 468.

According to one embodiment, previous versions of data items are made available to computationally intensive applications by extending the SQL language to allow SQL commands to specify a particular previous version for the data items. For example, the SQL language may be extended to support a "prev( )" function, which may be used in SQL statements to access previous versions of data items. Table 1 illustrates a SELECT statement that uses the prev( ) function to access previous versions of the values, contained in column c1 of table T, from the rows of T that satisfy the predicate c2=1.

TABLE 1

EXAMPLE OF A SELECT STATEMENT USED TO RETRIEVE PREVIOUS VERSIONS OF THE DATA ITEMS IN A SPECIFIED COLUMN

Select prev(c1, x) from T where c2 = 1

In the SELECT statement of table 1, the prev( ) function has two parameters: c1 and X. The c1 parameter indicates that the query is to return a previous version of values in column c1. The x designates the specific previous version that is desired for the data items in column c1. For example, if x is set to 0, then the database returns the current version of data items from column c1 of rows 302, 310, and 314. If x is set to 1, then the database server returns the version of data items from column c1 of rows 302, 310, and 314 that existed prior to the most recent change to each of those data items. If x is set to 4, then the database server returns the version of data items from column c1 of rows 302, 310, and 314 that existed prior to the four most recent changes to each of those data items.

Table 2 depicts the recent history of changes to the values in column c1 of rows 302, 310, and 314.

TABLE 2

| | Current values in C1 | Values in C1 prior to most recent change | Values in C1 prior to 2 most recent changes | Values in C1 prior to 3 most recent changes | Values in C1 prior to 4 most recent changes |
| --- | --- | --- | --- | --- | --- |
| Row 302 | 5 | 7 | 3 | 4 | 2 |
| Row 310 | 8 | 12 | 9 | 6 | 3 |
| Row 314 | 4 | 1 | 5 | 8 | 7 |

Based on this history, the database server would return the values 5, 8 and 4 in response to the statement "SELECT prev(c1, 0) from T where c2=1". Similarly, the database server would return the values 7, 12 and 1 in response to the statement "SELECT prev(c1, 1) from T where c2=1". Likewise, the database server would return the values 2, 3 and 7 in response to the statement "SELECT prev(c1, 1) from T where c2=1".

For all instances where x>0, the database server must obtain non-current values of data items specified in the query. According to one embodiment, these non-current values are retrieved from the undo records that were generated when the values were updated. Since the previous versions of row 302 are in undo record 472, rollback entries 490, 492, 494, and 496 would respectively contain the values 7, 3, 4 and 2 for column c1 of row 302.

Consequently, the database server would extract from rollback entry 496 the value 2 for column c1 of row 302 in response to the statement "SELECT prev(c1, 4) from T where c2=1". Likewise, execution of the query "SELECT prev(c1, 4) from T where c2=1" would cause the database server to extract the values from the fourth rollback entries in the undo records 470 and 468 for rows 310 and 314 respectively.

The following table 3 depicts an example of a high level algorithm commonly used in computationally intensive programs:

TABLE 3

EXAMPLE OF A HIGH LEVEL ALGORITHM

| | |
|---|---|
| STEP A. | perform a computation on the data in a set of data items |
| STEP B. | compare the value of a particular data item to previous values of the particular data item. |
| STEP C. | based on the comparison, decide whether to change the formula of the computation, to continue calculations, or to terminate. |
| STEP D. | execute the decision from step C. If the decision is not to terminate, then go to STEP A. |

In the following discussion, assume that the above algorithm in table 3 is being performed within a transaction that is executed by a database server. In this context, prior to performing the computation on a particular data item, at step A, the database generates a rollback entry and saves the state associated with that particular data item to the generated rollback entry. For example, assume that the computation at step A is going to result in the row 302 being changed from a value of 5, as shown in Table T, to a value of 7. Prior to updating the row 302 from 5 to 7, the database generates the rollback entry 490 and saves the value of 5 to the rollback entry 490. Also assume that on a subsequent iteration, the computation at step A results in the row 302 being changed from a value of 7 to a value of 9. Prior to updating the row 302 from 7 to 9, the database generates the rollback entry 492 and saves the value of 7 to the rollback entry 492. The rollback entries 494, 496, and 498 are generated in like manner. In so doing, the series of updates, e.g., 5, 7, 9, to the row 302, results in the generation of a series of records, e.g., rollback entries 492, 494, 496, and 498.

At step B, the current value of a particular data item is compared to previous values of the particular data item. In so doing, a SELECT statement similar to the one depicted in Table 1, could be used to retrieve the previous values of the specified data items, as already described herein.

At step C, a decision is made as to whether to change the formula of the computation, which is performed in step A, to continue calculations, or to terminate. For example, the results of the calculation performed at step A, may indicate that the formula associated with the calculation needs to be adjusted in some manner. If so, the decision to change the formula is made at step C. However, the results of the calculation performed at step A, may indicate that the formula associated with the calculation does not need to be adjusted. If so, computations are continued with the current formula. Likewise, the results of the calculation performed at step A, may indicate that it is not necessary to continue with the calculations. If so, the calculations are terminated.

At step D, the decision from step C is executed as previously discussed under step C.

As discussed, the SELECT statement depicted in Table 1 is used for retrieving previous versions of the data items in the specified column. However, it is possible that the calculation intensive application requires versions of all of the data items in a row. One approach to retrieve the desired data is to specify a "*" in place of the specified column, "c1", as depicted in Table 4 below. By varying the value of x starting with 1, to indicate the first previous version, up to the total number of previous versions, all of the previous versions for all of the data items in the rows, where column c2=1, can be retrieved.

TABLE 4

EXAMPLE OF A SELECT STATEMENT USED TO RETRIEVE PREVIOUS VERSIONS OF ALL THE DATA ITEMS IN THE SELECTED ROWS

Select prev(*, x) from T where c2 = 1

Clustering

Clustering is used in many areas of study that use computationally intensive calculations such as data mining, statistical analysis, and pattern recognition. One way to approach clustering is to find the regions where most of the data falls. These regions are considered to contain the most important data. The following algorithm, in table 5, shows one possible approach to clustering.

TABLE 5

AN EXAMPLE OF AN ALGORITHM USED IN CLUSTERING

| | |
|---|---|
| STEP 1. | obtain the next available sample from the database to fill the free space in the RAM buffer. |
| STEP 2. | update the current model over the contents of the RAM buffer. |
| STEP 3. | based on the updated model, classify the singleton data elements into one of the following sets:<br>a. needs to be kept in the buffer (set A).<br>b. can be thrown away with the updates to the sufficient statistics (set B).<br>c. reduced by compression and summarized as sufficient statistics (set C). |
| STEP 4. | stop if termination criteria is met; otherwise, go to STEP 1. |

Assume for the following discussion that the algorithm in table 4 is implemented using the techniques described herein. For example, step 1 may be implemented as a query of the database to fill up the RAM buffer. Each row of the database represents a data point. Step 2 is another iteration, called K-means, which parameterizes a particular cluster by the mean of all the points in the cluster. According to one embodiment, this step is included in a transaction, which executes in a database server as described herein. For each row, the distance between the data point, or row, and the nearest cluster center is computed. Then the row is assigned to a cluster, for example by assigning the row a cluster ID. If the assignment to the cluster does not change, for example because the cluster ID is the same as the cluster ID from the previous few iterations, then the calculations are terminated. The cluster ID may be stored in a column of the database. The cluster ID from previous iterations can be read from an undo segment using a SELECT statement such as the one seen in Table 4.

Step 3 may be computed using PL/SQL. The sets—set A, set B, set C—can be organized using indexing methods provided by the database. Furthermore, the set memberships—set A, set B, set C—can be stored as set IDs in a column of the database. At step 4, the termination criteria involves comparing the set membership, or set ID, with the set memberships, or set IDs, from previous interactions. This can be accomplished in a similar manner as that described in step 2.

After an iteration has completed, the results from the iteration can either be exported, for example as the transaction is rolled back, or be recorded as a part of the table, for example as the transaction commits.

Access Methods

Any number of access methods can be used to optimize the performance of accessing the previous values of data items. Assuming that the rollback entries are in a linked list, one way of accessing the previous values in the rollback entries is to access them sequentially. For example, if the fourth version of row 302 is desired, the sequential access method would start the traversal at rollback entry 490 and proceed down the linked list to rollback entry 496. Examples of other access methods, include but are not limited to, a hashing algorithm, building an index, or an array of pointers, where each element in the array is a pointer to a different rollback entry in an undo record. For example, an array of pointers to the rollback entries of undo record 472 would have five pointers to the five rollback entries in the undo record 472, where the first pointer references rollback entry 490, the second pointer references rollback entry 492, and so on. In so doing, a rollback entry in the middle of an undo record, such as rollback entry 494, could be accessed directly.

Hardware Overview

Figure 5:
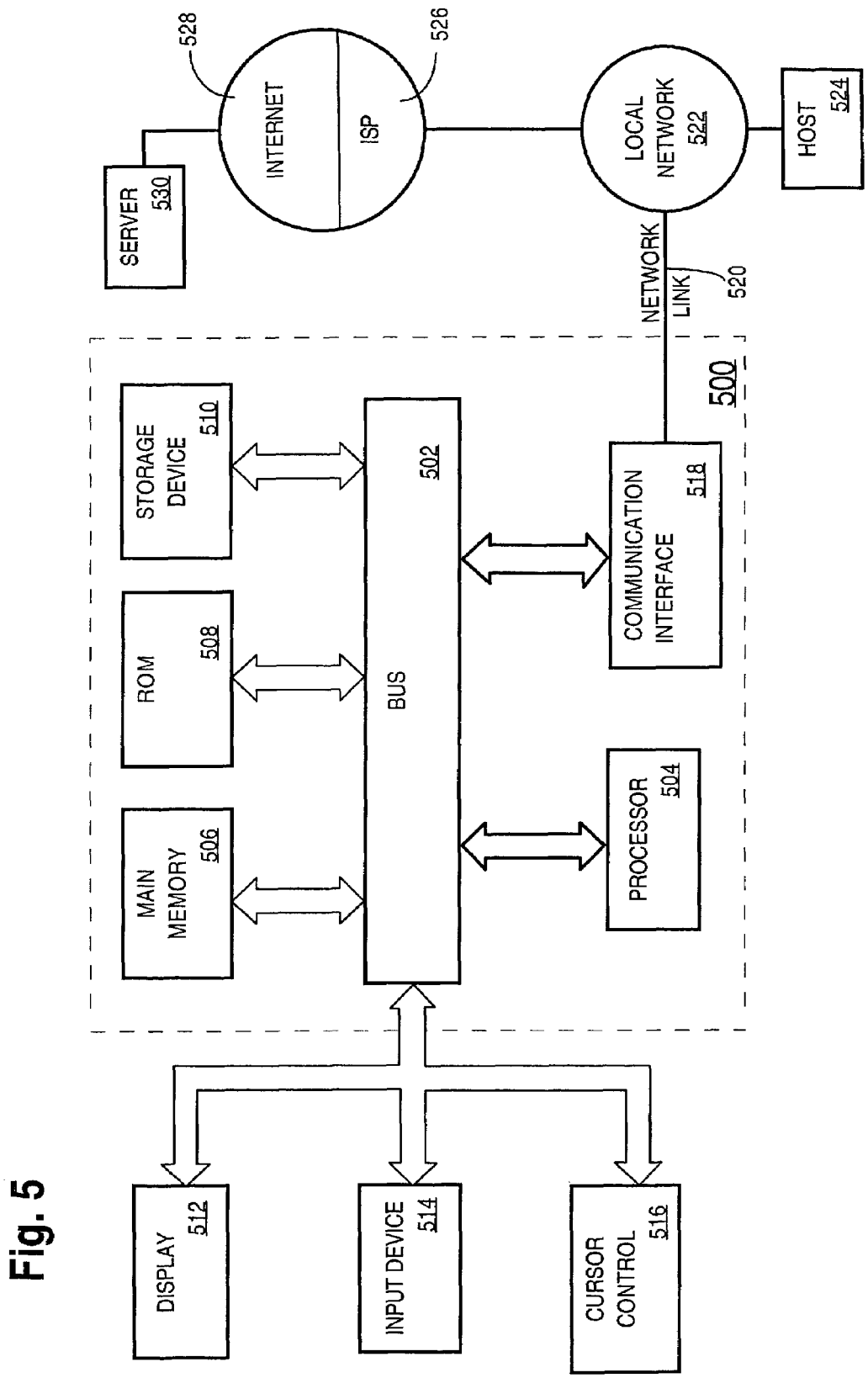
FIG. 5 is a computer system for implementing one embodiment of the present invention.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for accessing non-current data managed by a database server, the method comprising the steps of:
    a) in response to the database server performing an update to a data item, the database server generating a record that reflects a state of the data item prior to the update;
    b) repeating step (a) for a series of updates to the data item to generate a corresponding series of records;
    c) receiving at the database server a database command that requests a non-current version of the data item,
        wherein the database command specifies a column of a relational table that includes the data item,
        wherein the database command includes a parameter value that explicitly specifies which update, within the series of updates, is to be supplied to the database command;
        wherein the parameter value indicates the particular update by specifying a numerical value that indicates where, relative to the end of the series of updates, the particular update occurs;
    d) selecting a record from the series of records based on the parameter value; and
    e) responding to the database command by providing a non-current version of the data item based on information contained in the selected record.

2. The method of claim 1 wherein the steps of:
    repeating step (a) for a series of updates; and
    responding to the database command;
    are performed by the database server within a single transaction.

3. The method of claim 1 wherein the steps are performed in a single database server.

4. The method of claim 1 wherein the record is a particular rollback entry in an undo record.

5. The method of claim 1 further comprising the step of performing a comparison between the current version of the data item to the non-current version of the data item.

6. The method of claim 5 wherein the step of comparing further comprises the step of determining, based upon said comparison, whether to modify a formula used in performing calculations, to continue the calculations, or to terminate the calculations.

7. The method of claim 1 wherein step (e) further comprises the step of accessing the non-current version of the data item with an access method selected from a set consisting of a hashing algorithm, an array of pointers, a linked list, and a database index.

8. The method of claim 7 wherein the step of accessing the non-current version of the data item is performed using a hashing algorithm.

9. The method of claim 7 wherein the step of accessing the non-current version of the data item access is performed using an array of pointers, where each element in the array of pointers references a different record in the series of records.

10. The method of claim 7 wherein the series of records is a linked list of records and the step of accessing the non-current version of the data item is performed by traversing the linked list to access the non-current version of the data item.

11. The method of claim 7 wherein the step of accessing the non-current version of the data item is performed using a database index.

12. A computer-readable storage medium storing instructions for accessing non-current data managed by a database server, the instructions including instructions which, when executed by one or more processors, cause said one or more processors to perform the steps of:
    a) in response to the database server performing an update to a data item, the database server generating a record that reflects a state of the data item prior to the update;
    b) repeating step (a) for a series of updates to the data item to generate a corresponding series of records;
    c) receiving at the database server a database command that requests a non-current version of the data item,
        wherein the database command specifies a column of a relational table that includes the data item,
        wherein the database command includes a parameter value that explicitly specifies which update, within the series of updates, is to be supplied to the database command;
        wherein the parameter value indicates the particular update by specifying a numerical value that indicates where, relative to the end of the series of updates, the particular update occurs;
    d) selecting a record from the series of records based on the parameter value; and
    e) responding to the database command by providing a non-current version of the data item based on information contained in the selected record.

13. The computer-readable storage medium of claim 12 wherein the steps of:
    repeating step (a) for a series of updates; and
    responding to the database command;
    are performed by the database server within a single transaction.

14. The computer-readable storage medium of claim 12 wherein the steps are performed in a single database server.

15. The computer-readable storage medium of claim 12 wherein the record is a particular rollback entry in an undo record.

16. The computer-readable storage medium of claim 12 further comprising instructions for performing the step of performing a comparison between the current version of the data item to the non-current version of the data item.

17. The computer-readable storage medium of claim 16 wherein the step of comparing further comprises the step of determining, based upon said comparison, whether to modify a formula used in performing calculations, to continue the calculations, or to terminate the calculations.

18. The computer-readable storage medium of claim 15 wherein step (e) further comprises the step of accessing the non-current version of the data item with an access mechanism selected from a set consisting of a hashing algorithm, an array of pointers, a linked list, and a database index.

19. The computer-readable storage medium of claim 18 wherein the step of accessing the non-current version of the data item is performed using a hashing algorithm.

20. The computer-readable storage medium of claim 18 wherein the step of accessing the non-current version of the data item access is performed using an array of pointers, where each element in the array of pointers references a different record in the series of records.

21. The computer-readable storage medium of claim 18 wherein the series of records is a linked list of records and the step of accessing the non-current version of the data item is performed by traversing the linked list to access the non-current version of the data item.

22. The computer-readable storage medium of claim 18 wherein the step of accessing the non-current version of the data item is performed using a database index.

23. The computer-readable storage medium of claim 12 wherein the database command is based on a SELECT statement and the SELECT statement includes parameter value that indicates the particular update of the series of updates.

* * * * *